US012202998B2

(12) United States Patent
Casarrubias et al.

(10) Patent No.: US 12,202,998 B2
(45) Date of Patent: Jan. 21, 2025

(54) PROCESSES FOR MAKING COATED FILMS AND SOLVENTLESS POLYURETHANE PRECURSORS THAT MAY BE USED TO MAKE COATED FILMS

(71) Applicants: Dow Global Technologies LLC, Midland, MI (US); Rohm and Haas Company, Collegeville, PA (US)

(72) Inventors: Juan Carlos Casarrubias, Toluca (MX); Jorge Caminero Gomes, São Paulo (BR); Nicolas Cardoso Mazzola, São Paulo (BR); Mateus Batista Torres Cipro, São Paulo (BR); Mai Chen, Chicago, IL (US); Kevin K. Miyake, Tower Lakes, IL (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 917 days.

(21) Appl. No.: 16/973,948

(22) PCT Filed: May 22, 2019

(86) PCT No.: PCT/US2019/033503
§ 371 (c)(1),
(2) Date: Dec. 10, 2020

(87) PCT Pub. No.: WO2019/240922
PCT Pub. Date: Dec. 19, 2019

(65) Prior Publication Data
US 2021/0246332 A1 Aug. 12, 2021

Related U.S. Application Data

(60) Provisional application No. 62/683,356, filed on Jun. 11, 2018.

(51) Int. Cl.
*C09D 175/08* (2006.01)
*C08G 18/12* (2006.01)
(Continued)

(52) U.S. Cl.
CPC ........... *C09D 175/08* (2013.01); *C08G 18/12* (2013.01); *C08G 18/3206* (2013.01);
(Continued)

(58) Field of Classification Search
CPC C08G 18/12; C08G 18/3206; C08G 18/4018; C08G 18/4238; C08G 18/4825;
(Continued)

(56) References Cited

U.S. PATENT DOCUMENTS 3,645,992 A   2/1972   Elston
3,914,342 A   10/1975  Mitchell
(Continued)

FOREIGN PATENT DOCUMENTS

CN    1187168 A    7/1998
CN    102209627 A    10/2011
(Continued)

OTHER PUBLICATIONS

Translation of Japanese Office Action dated Apr. 25, 2023, pertaining to JP Patent Application No. 2020-564930.
(Continued)

*Primary Examiner* — S. Behrooz Ghorishi
(74) *Attorney, Agent, or Firm* — Dinsmore & Shohl LLP

(57) ABSTRACT

According to one or more embodiments of the present disclosure, a coated film may be made by a process that may include applying an uncured polyurethane precursor between a polyolefin film and a release liner such that a first surface of the release liner is in contact with the uncured polyurethane precursor, curing the uncured polyurethane precursor to form a cured polyurethane layer positioned
(Continued)

between the polyolefin film and the release liner, and removing the release liner to form the coated film comprising the polyolefin film and the cured polyurethane layer. The first surface of the release liner may have an optical finish. The curing may impart an optical finish to the cured polyurethane layer substantially similar to the optical finish of the first surface of the release liner.

19 Claims, 5 Drawing Sheets

(51) Int. Cl.
| | | |
|---|---|---|
| *C08G 18/32* | (2006.01) | |
| *C08G 18/40* | (2006.01) | |
| *C08G 18/42* | (2006.01) | |
| *C08G 18/48* | (2006.01) | |
| *C08G 18/66* | (2006.01) | |
| *C08G 18/76* | (2006.01) | |
| *C08G 18/79* | (2006.01) | |

(52) U.S. Cl.
CPC ..... *C08G 18/4018* (2013.01); *C08G 18/4238* (2013.01); *C08G 18/4825* (2013.01); *C08G 18/4891* (2013.01); *C08G 18/6674* (2013.01); *C08G 18/7671* (2013.01); *C08G 18/797* (2013.01)

(58) Field of Classification Search
CPC ............ C08G 18/4891; C08G 18/6674; C08G 18/7671; C08G 18/797; C08G 18/10; C09D 175/08; C09D 175/04; C08J 2323/02; C08J 2323/04; C08J 2475/04
See application file for complete search history.

(56) References Cited

U.S. PATENT DOCUMENTS

| | | | |
|---|---|---|---|
| 3,919,032 | A | 11/1975 | Greenbarg |
| 4,076,698 | A | 2/1978 | Anderson et al. |
| 4,599,392 | A | 7/1986 | McKinney et al. |
| 5,272,236 | A | 12/1993 | Lai et al. |
| 5,278,272 | A | 1/1994 | Lai et al. |
| 5,582,923 | A | 12/1996 | Kale et al. |
| 5,733,155 | A | 3/1998 | Sagawa |
| 5,854,045 | A | 12/1998 | Fang et al. |
| 6,405,969 | B1 | 6/2002 | Ogren et al. |
| 7,132,142 | B2 | 11/2006 | Truog et al. |
| 7,722,938 | B2 | 5/2010 | Truog et al. |
| 7,807,246 | B2 | 10/2010 | Truog et al. |
| 7,905,981 | B2 | 3/2011 | Truog et al. |
| 8,568,849 | B2 | 10/2013 | Shi et al. |
| 9,089,871 | B2 | 7/2015 | Gringoire et al. |
| 11,034,138 | B2 | 6/2021 | Miyake et al. |
| 2003/0039785 | A1 | 2/2003 | Dronzek, Jr. |
| 2009/0062432 | A1* | 3/2009 | Doesburg ........... C08G 18/8051 524/425 |
| 2011/0289647 | A1* | 12/2011 | Chiao ..................... B32B 37/02 156/60 |
| 2013/0189501 | A1 | 7/2013 | Gringoire et al. |
| 2014/0087198 | A1 | 3/2014 | Hou et al. |
| 2018/0079800 | A1 | 3/2018 | Miyake et al. |
| 2018/0079880 | A1 | 3/2018 | Miyake et al. |

FOREIGN PATENT DOCUMENTS

| | | | |
|---|---|---|---|
| CN | 103508246 | A | 1/2014 |
| CN | 204508383 | U | 7/2015 |
| CN | 205526940 | U | 8/2016 |
| CN | 106865318 | A | 6/2017 |
| CN | 107636050 | A | 1/2018 |
| EP | 2167244 | A2 | 3/2010 |
| EP | 2167244 | B1 | 9/2015 |
| JP | H09151317 | A | 6/1997 |
| JP | 20000015761 | A | 1/2000 |
| JP | 2003509292 | A | 3/2003 |
| JP | 2006520260 | A | 9/2006 |
| JP | 2008137252 | A | 6/2008 |
| JP | 2011255639 | A | 12/2011 |
| WO | WO-2004074386 | A2 * | 9/2004 ............... B32B 7/06 |
| WO | 2010039949 | A1 | 4/2010 |
| WO | 2012020109 | A2 | 2/2012 |
| WO | 2014113623 | A2 | 7/2014 |
| WO | WO-2016196168 | A1 * | 12/2016 ............. B32B 27/08 |
| WO | 2018063578 | A1 | 4/2018 |
| WO | 2018064123 | A1 | 4/2018 |

OTHER PUBLICATIONS

Japanese Office Action dated May 16, 2023, pertaining to JP Patent Application No. 2020-564942.
Examination Report dated Jan. 31, 2022, pertaining to EP Patent Application No. 19730029.6.
Chinese Office Action and Search Report, dated Aug. 14, 2023, pertaining to Chinese Patent Application No. 20198003168.3, 8 pages.
U.S. Office Action, dated Jul. 26, 2023, pertaining to U.S. Appl. No. 16/973,936, 6 pgs.
Examination Report dated Jul. 15, 2022, pertaining to IN Patent Application No. 202017053597, 6 pgs.
Translation of Taiwan Office Action dated Sep. 28, 2022, pertaining to TW Patent Application No. 108119960, 23 pgs.
Translation of Office Action dated Dec. 19, 2022, pertaining to CN Patent Application No. 201980031682.3, 6 pgs.
Chinese Office Action dated Aug. 26, 2022, pertaining to CN Patent Application No. 201980032153.5, 6 pgs.
Chinese Office Action dated Sep. 9, 2022, pertaining to CN Patent Application No. 201980032372.3, 6 pgs.
Translation of Search Report dated Dec. 1, 2022, pertaining to TW Patent Application No. 108119961, 1 pg.
Technical Report dated Dec. 21, 2022, pertaining to BR Patent Application No. BR112020023176-2, 4 pgs.
Translation of Chinese Office Action dated Mar. 25, 2022, pertaining to Chinese Patent Application No. 201980032153.5, 10 pgs.
Translation of Chinese Office Action dated Mar. 25, 2022, pertaining to Chinese Patent Application No. 201980032372.3, 14 pgs.
Technical Report dated Oct. 25, 2022, pertaining to BR Patent Application No. BR112020023030-8, 7 pgs.
Chinese Office Action dated Jul. 4, 2022, pertaining to JP Patent Application No. 201980031682.3, 10 pgs.
Examination Report dated Jun. 9, 2022, pertaining to IN Patent Application No. 202017053596, 6 pgs.
Examination Report dated Jul. 21, 2022, pertaining to IN Patent Application No. 202017054019, 5 pgs.
International Search Report and Written Opinion pertaining to PCT/US2019/033496, dated Sep. 10, 2019.
International Search Report and Written Opinion pertaining to PCT/US2019/033503, dated Sep. 12, 2019.
International Search Report and Written Opinion pertaining to PCT/US2019/033506, dated Sep. 11, 2019.
US Office Action dated Dec. 26, 2023, pertaining to U.S. Appl. No. 16/973,946, 11 pgs.
Communication Pursuant to Article 94(3) EPC dated Feb. 22, 2024, pertaining to EP Patent Application No. 19 730 029.6, 3 pgs.
Taiwan Office Action dated Nov. 10, 2023, pertaining to TW Patent Application No. 108119960, 7 pgs.
Japanese Office Action dated Dec. 19, 2023, pertaining to JP Patent Application No. 2020-564942, 10 pgs.
Japanese Office Action dated Jun. 18, 2024, pertaining to JP Patent Application No. 2020-564942, 8 pgs.
Mexican Office Action dated May 15, 2024, pertaining to MX Patent Application No. MX/a/2020/012519, 10 pgs.
Mexican Office Action dated Feb. 9, 2024, pertaining to MX Patent Application No. MX/a/2020/012519, 14 pgs.

(56) References Cited

OTHER PUBLICATIONS

US Office Action dated Jun. 6, 2024, pertaining to U.S. Appl. No. 16/973,936, 10 pgs.
US Office Action dated Jun. 4, 2024, pertaining to U.S. Appl. No. 16/973,946, 10 pgs.
Mexican Office Action dated Jul. 15, 2024, pertaining to MX Patent Application No. MX/a/2020/012521, 14 pgs.
Taiwan Office Action dated Aug. 23, 2024, pertaining to TW Patent Application No. 108119960, 22 pgs.
Mexican Office Action dated Aug. 22, 2024, pertaining to MX Patent Application No. MX/a/2020/012519, 12 pgs.
US Office Action dated Nov. 7, 2024, pertaining to U.S. Appl. No. 16/973,936, 9 pgs.
Brazil Office Action dated Sep. 26, 2024, pertaining to BR Patent Application No. 112020023181-9, 6 pgs.
Communication pursuant to Article 94(3) EPC dated Oct. 16, 2024, pertaining to EP Patent Application No. 19730032.0, 6 pgs.

* cited by examiner

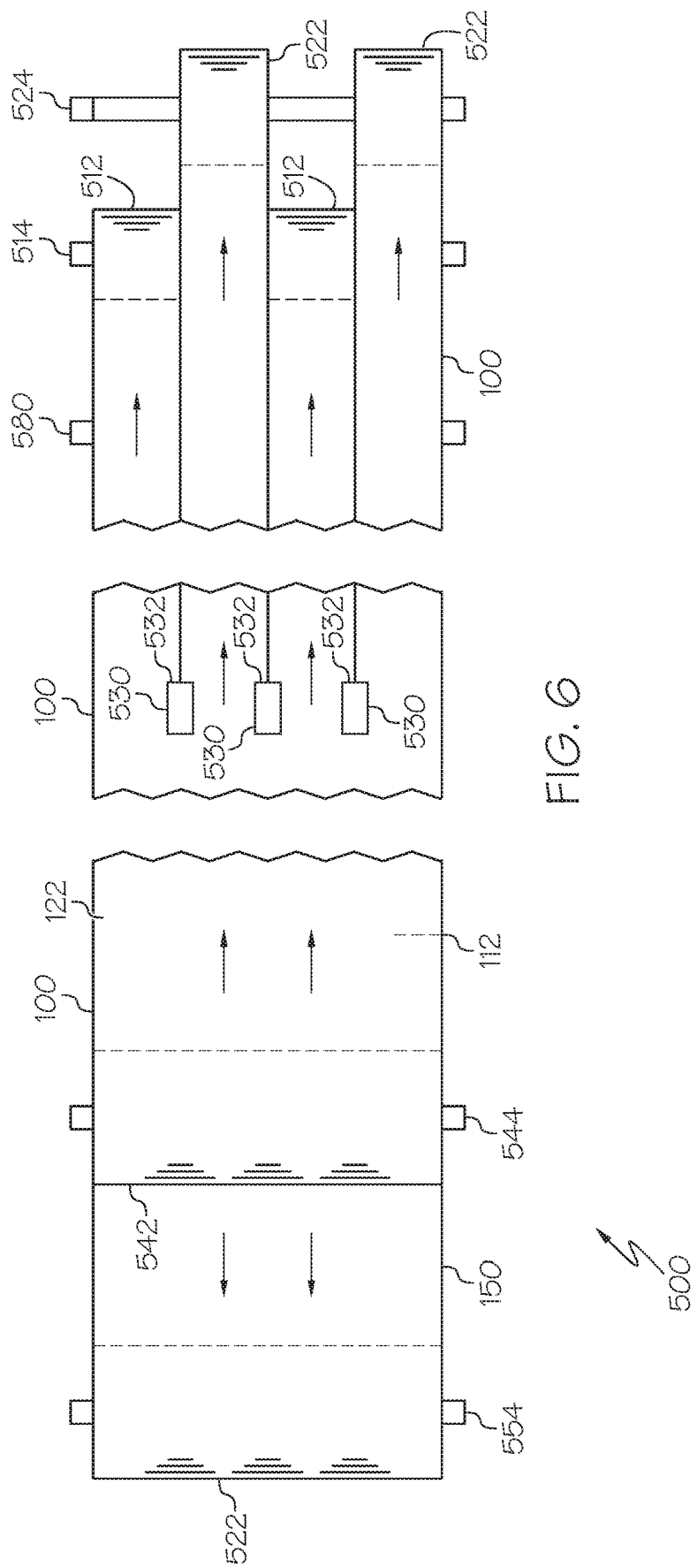

PROCESSES FOR MAKING COATED FILMS AND SOLVENTLESS POLYURETHANE PRECURSORS THAT MAY BE USED TO MAKE COATED FILMS

CROSS-REFERENCE TO RELATED APPLICATIONS

This application is a National Stage Entry under 35 U.S.C. § 371 of International Patent Application No. PCT/US2019/033503, filed May 22, 2019, which claims priority to U.S. Provisional Patent Application Ser. No. 62/683,356, filed Jun. 11, 2018, both of which are incorporated by reference in their entireties.

TECHNICAL FIELD

The present disclosure generally relates to films and methods for the production thereof and, more specifically, to coated polymeric films and methods and apparatuses utilized in the making thereof.

BACKGROUND

Many types of flexible and semi-rigid packaging created to protect food, beverages, other liquids, personal care, and other consumer products have been manufactured with a typical structure that combines polyester and/or polypropylene with polyethylene films, using a reactive polyurethane adhesive to make a lamination between these layers. While such structures have several desirable properties, new structures are needed with reduced material usage, reduced costs, and/or other improvements while retaining one or more of the desirable properties that existing laminated structures offer.

SUMMARY

Embodiments of the present disclosure may meet those needs by providing improved methods for the manufacture of coated films, as well as precursor materials that may be utilized in making such coated films that, in some embodiments, may not utilize a polyester and/or polypropylene layer of previous films. Moreover, the embodiments presently disclosed may retain desirable properties similar, in at least some respects, to the optical and/or thermal properties of conventional multilayer films. According to one or more embodiments, such a coated film may be made by utilizing the presently disclosed polyurethane compositions and/or incorporating presently described methods whereby a release liner is temporarily laminated to the polyurethane layer and subsequently removed after curing of the polyurethane layer to expose the polyurethane layer as an exterior coating on a polyolefin film. The polyurethane coating may advantageously mimic one or more optical properties of the release liner. This advantageously allows a manufacturer to adjust the optical properties of a coated film by using different release liners while using the same film composition and the same coating. In some embodiments, the release liner can advantageously be reused, thereby providing an additional cost savings.

In one or more embodiments, by utilizing a release liner with the coated film embodiments presently disclosed, the cured polyurethane layer may mimic the optical properties of the release liner such that the optical finish of the cured polyurethane is substantially similar to the optical finish of the release liner. For example, according to a testing standard such as ASTM D2457, the coated film may have gloss or matte finish that is within 25 units of the release liner when measured at 60° for a gloss finish or 85° for a matte finish. For example, in some embodiments, a release liner with a gloss finish (such as from 40 units to 100 units) may be utilized to impart a gloss finish on the coated film that is within 25 units, within 20 units, within 15 units, within 10 units, or even within 5 units of the release liner when measured at 60°. In additional embodiments, a release liner with a matte finish (such as from 15 units to 30 units) may be utilized to impart a matte finish on the coated film that is within 25 units, within 20 units, within 15 units, within 10 units, or even within 5 units of the release liner when measured at 85°.

According to one or more embodiments of the present disclosure, a coated film may be made by a process that may comprise applying an uncured polyurethane precursor between a polyolefin film and a release liner such that a first surface of the release liner is in contact with the uncured polyurethane precursor, curing the uncured polyurethane precursor to form a cured polyurethane layer positioned between the polyolefin film and the release liner, and removing the release liner to form the coated film comprising the polyolefin film and the cured polyurethane layer. The first surface of the release liner may have an optical finish. The curing may impart an optical finish to the cured polyurethane layer substantially similar to the optical finish of the first surface of the release liner.

According to one or more additional embodiments of the present disclosure, a coated film may be made by a process that may comprise applying an uncured polyurethane precursor onto a polyolefin film as it is translated in a machine direction, applying a release liner onto the uncured polyurethane precursor as it is translated in the machine direction such that a first surface of the release liner is in contact with the uncured polyurethane precursor, curing the uncured polyurethane precursor to form a cured polyurethane layer positioned between the polyolefin film and the release liner, and removing the release liner to form the coated film comprising the polyolefin film and the cured polyurethane layer. The first surface of the release liner may have an optical finish. The uncured polyurethane precursor may be disposed between the polyolefin film and the release liner. The curing may impart an optical finish to the cured polyurethane layer substantially similar to the optical finish of the first surface of the release liner. The release liner may be removed as the coated film is translated in a machine direction.

According to one or more yet additional embodiments of the present disclosure, a solventless polyurethane precursor may comprise an isocyanate component and an isocyanate-reactive component. The isocyanate component may comprise an isocyanate-terminated prepolymer, and may have an isocyanate (NCO) content greater than 10%. The isocyanate-reactive component may comprise at least one bio-based polyol. The bio-based polyol in the isocyanate-reactive component may be, by weight based on the weight of the isocyanate-reactive component, at least 50 wt. %. The solventless polyurethane precursor may comprise less than 1 wt. % of volatile organic compounds.

These and other embodiments are described in more detail in the Detailed Description. It is to be understood that both the foregoing general description and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and together with the description serve to explain the principles and operations of the technology. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and wherein:

FIG. 6 schematically depicts a top view of a slitting machine that may be utilized to remove the release liner, according to one or more embodiments of the present disclosure.

DETAILED DESCRIPTION

Figure 1:
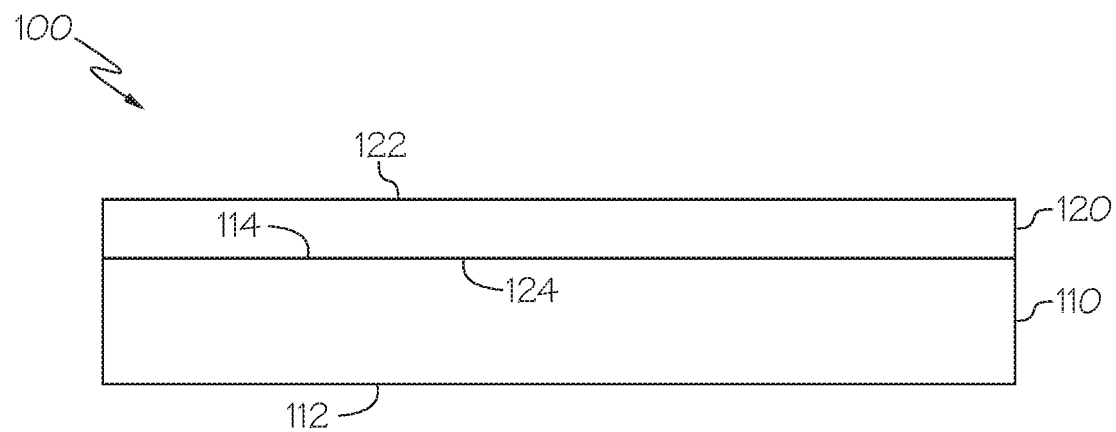
FIG. 1 schematically depicts a coated film, according to one or more embodiments of the present disclosure.

Reference will now be made in greater detail to various embodiments, some embodiments of which are illustrated in the accompanying drawings. Now referring to FIG. 1, according to one or more embodiments, a coated film 100 may include a polyolefin film 110 and a coating 120. The coating 120 may generally be deposited upon a surface of the polyolefin film 110. For example, as depicted in FIG. 1, the polyolefin film 110 may comprise a first surface 114 and a second surface 112, where the first surface 114 may be opposite the second surface 112. The coating 120 may comprise an outer surface 122 and in internal surface 124. The outer surface 122 may be the most outer surface of the coated film 100 (i.e., there may not be another layer deposited over the coating 120, such that the outer surface 122 is in direct contact with the surrounding air). As such, the outer surface 122 of the coating 120 may be an outer surface of the coated film 100. The coating 120 may be deposited on the first surface 114 of the polyolefin film 110 with the internal surface 124 of the coating 120 in direct contact with the first surface 114 of the polyolefin film 110. The second surface 112 may be an outer surface (i.e., no other layers may be deposited upon the second surface 112 of the polyolefin film 110). However, it is contemplated that, in additional embodiments, the polyolefin film 110 may be in contact with additional films or layers, such as through lamination.

In one or more embodiments, the polyolefin film may comprise one or more olefinic polymers. The term, "olefin-based polymer," "olefinic polymer," and "polyolefin," as used herein, refer to a polymer that comprises, in polymerized form, a majority amount of olefin monomer, for example, ethylene or propylene (based on the weight of the polymer) and, optionally, may comprise one or more comonomers. The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers. The polyolefin film 110 may be a multilayer film which contains more than one layer. As described herein, a "multilayer film" means any film having more than one layer. For example, the multilayer film may have two, three, four, five or more layers. A multilayer film may be described as having the layers designated with letters to assist in describing the film. For example, a three layer film having a core layer B, and two external layers A and C may be designated as A/B/C. Likewise, a structure having two core layers B and C and two external layers A and D would be designated A/B/C/D. In some embodiments, the polyolefin films may be coextruded films with an odd number of layers from 3 to 35, such as from 3 to 11 or from 3 to 7.

In one or more embodiments, the polyolefin film may comprise an ethylene-based polymer. As described herein, "polyethylene" or an "ethylene-based polymer" shall mean polymers comprising greater than 50% by mole of units derived from ethylene monomer. This includes ethylene-based homopolymers or copolymers (meaning units derived from two or more comonomers). Common forms of polyethylene known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

Additionally, as described herein, the term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599, 392, which is hereby incorporated by reference). LDPE resins typically have a density in the range of 0.916 to 0.940 g/cm.

The term "LLDPE", as described herein, may include resins made using Ziegler-Natta catalyst systems as well as resin made using single-site catalysts, including, but not limited to, bis-metallocene catalysts (sometimes referred to as "m-LLDPE"), phosphinimine, and constrained geometry catalysts; and resin made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236; 5,278,272; 5,582,923; and 5,733,155; the homogeneously branched ethylene polymers such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342 or U.S. Pat. No.

5,854,045). The LLDPE resins can be made via gas-phase, solution-phase or slurry polymerization or any combination thereof, using any type of reactor or reactor configuration known in the art. The LLDPE resins can be made via gas-phase, solution-phase, or slurry polymerization or any combination thereof, using any type of reactor or reactor configuration known in the art.

Additionally, as described herein, the term "HDPE" refers to polyethylenes having densities of about 0.940 g/cm or greater, which are generally prepared with Ziegler-Natta catalysts, chrome catalysts or even metallocene catalysts.

In one or more embodiments, the polyolefin film 110 may be a multilayer film which includes an outer layer comprising an ethylene-based polymer. Examples of such ethylene-based polymers may include those commercially available from The Dow Chemical Company, Midland, MI including, for example, AFFINITY™ PF1140G, AFFINITY™ PL 1850G, AFFINITY™ PL 1880, AFFINITY™ PL 1881, or AFFINITY™ PF1166G. Additional examples of ethylene-based polymers, such as LDPE polymers, may include those commercially available from The Dow Chemical Company, Midland, MI including, for example, DOW™ LDPE 432E, LDPE 312E, LDPE 310E, or LDPE PG 7008. In one or more embodiments, the polyolefin film 110 may be a five layer multilayer film comprised of layers of polyetheylene/polyethylene/polyamide/polyethylene/polyethylene.

In one or more embodiments, the polyolefin film 110 may have a thickness of less than or equal to 1 mm, such as less than or equal to 900 microns, less than or equal to 800 microns, less than or equal to 700 microns, less than or equal to 600 microns, less than or equal to 500 microns, less than or equal to 400 microns, less than or equal to 300 microns, or even less than or equal to 200 microns. The polyolefin film 110 may have a thickness of greater than or equal to 1 micron, greater than or equal to 5 microns, greater than or equal to 10 microns, greater than or equal to 20 microns, greater than or equal to 30 microns, greater than or equal to 40 microns, or even greater than or equal to 50 microns. As is understood by those skilled in the art, in multilayer films, the thicknesses of the different layers can be the same or different depending on the function of the layer (e.g., sealant, barrier, tie, etc.) and other factors. Layer thicknesses may be selected by techniques known to those having skill based on the teachings herein.

Figure 2:
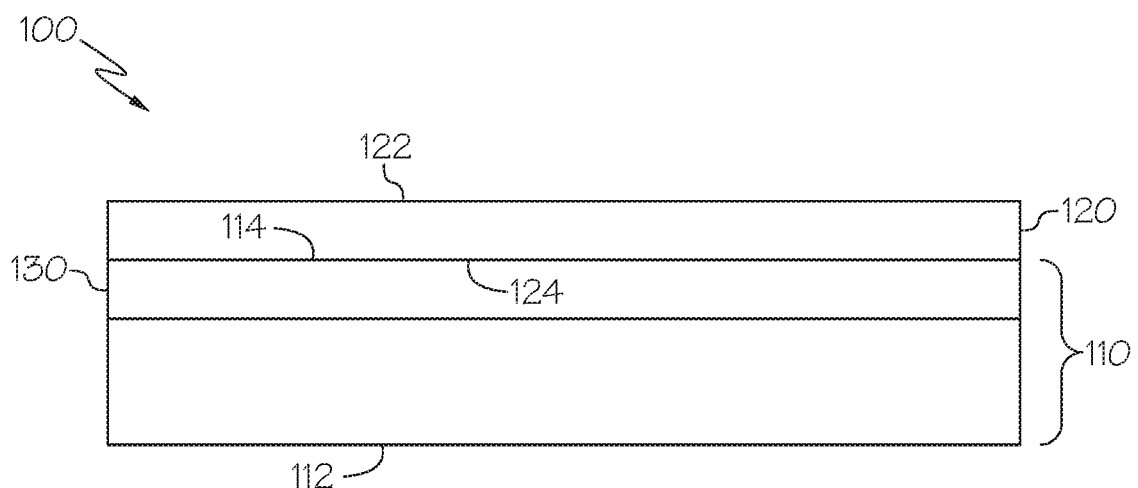
FIG. 2 schematically depicts another embodiment of a coated film, according to one or more embodiments of the present disclosure.

Now referring to FIG. 2, in some embodiments, the polyolefin film 110 may include a printed layer 130 on a first surface 114, where the printed layer 130 may be in contact with the coating 120. In such embodiments, the coating 120 may be applied directly onto the printed layer 130. The printed layer 130 may be an ink layer to show product details and other packaging information in various colors. The printed layer 130 may be less than or equal to 15 microns, less than or equal to less than or equal to 10 microns, less than or equal to 5 microns, or even less than or equal to 2.5 microns, in various embodiments.

In one or more embodiments, the polyolefin film 110 may be a monolayer film or a multilayer film. In such embodiments, the monolayer film or multilayer film may comprises polyolefin in an amount of at least 90 wt. %, at least 92 wt. %, at least 94 wt. %, at least 96 wt. %, at least 98 wt. %, at least 99 wt. %, at least 99.5 wt. %, at least 99.9 wt. %, or even at least 99.99 wt. %. According to additional embodiments, the polyolefin film 100 (monolayer or multilayer) may comprise an ethylene-based polymer or propylene-based polymer. For example, in one or more embodiments, the polyolefin film 110 may comprise an ethylene-based polymer in an amount of at least 90 wt. %, at least 92 wt. %, at least 94 wt. %, at least 96 wt. %, at least 98 wt. %, at least 99 wt. %, at least 99.5 wt. %, at least 99.9 wt. %, or even at least 99.99 wt. %.

According to additional embodiments, the polyolefin film 110 may be a multilayer film wherein its outermost layer (i.e., the layer nearest the polyurethane) comprise polyolefin in an amount of at least 90 wt. %, at least 92 wt. %, at least 94 wt. %, at least 96 wt. %, at least 98 wt. %, at least 99 wt. %, at least 99.5 wt. %, at least 99.9 wt. %, or even at least 99.99 wt. %. According to additional embodiments, the outermost layer of the polyolefin film 100 (a multilayer film) may comprise an ethylene-based polymer or propylene-based polymer. For example, in one or more embodiments, the outermost layer of the polyolefin film 110 may comprise an ethylene-based polymer in an amount of at least 90 wt. %, at least 92 wt. %, at least 94 wt. %, at least 96 wt. %, at least 98 wt. %, at least 99 wt. %, at least 99.5 wt. %, at least 99.9 wt. %, or even at least 99.99 wt. %. It should be understood that the composition of the other layers can vary in such embodiments depending on the desired film properties (e.g., barrier properties).

In one or more embodiments, the polyolefin film 110 may include a plurality of layers, wherein multiple layers have the same composition. In such embodiments, it is contemplated that a plurality of polyethylene layers may be the same or may vary in composition and weight ratio between respective layers. In additional embodiments, multilayer films may have a hybrid structure wherein one or more of the core or inner layers (i.e., non-outer layers) do not have the same composition as the outer layers. For example, the one or more inner or core layers may include polyolefins, polyamides, ethylene vinyl alcohol, ethylene vinyl acetate, ethylene acrylic acid, ethylene maleic anhydride, or combinations thereof. For example, multilayer films utilized as the polyolefin film 110 may include one inner layer comprising one or more polyolefins, and a second inner layer comprising a second polyolefin, a polyamide, ethylene vinyl alcohol, ethylene vinyl acetate, ethylene acrylic acid, ethylene maleic anhydride, or combinations thereof. Depending on the application, other components are contemplated for the internal layers (e.g., core or inner layers), such as adhesives, tie layers, barrier layers, printing, or other components may be used.

In additional embodiments, the polyolefin film 110 may include one or more barrier layers. The barrier layer may be adhered to, for example, a polyethylene layer by a tie layer. In such embodiments, the tie layer may be referred to as Layer B, and may be positioned between the barrier layer (referred to as Layer C) and another layer (Layer A, discussed below) in an A/B/C arrangement. The barrier layer (Layer C) may comprise one or more poly amides (nylons), amorphous polyamides (nylons), and/or ethylene vinyl alcohol copolymers (EVOH), and can include scavenger materials and compounds of heavy metals like cobalt with MXD6 nylon. EVOH includes a vinyl alcohol copolymer having 27 to 44 mol % ethylene, and is prepared by, for example, hydrolysis of vinyl acetate copolymers. Examples of commercially available EVOH that can be used in embodiments of the present invention include EVAL™ from Kuraray and Noltex™ and Soarnol™ from Nippon Goshei. In some embodiments, the barrier layer can comprise EVOH and an anhydride and/or carboxylic acid functionalized ethylene/alpha-olefin interpolymer, such as those barrier layers disclosed in PCT Publication No. WO 2014/113623, which is hereby incorporated by reference. This inclusion of anhydride and/or carboxylic acid functionalized ethylene/alpha-olefin interpolymer can enhance the flex crack resistance of the EVOH, and is believed to provide less points of stress at the interlayer with the tie resin, hence decreasing formation of voids that could negatively impact the gas barrier properties of the overall multilayer structure.

In embodiments where a barrier layer comprises polyamide, the polyamide can include polyamide 6, polyamide 9, polyamide 10, polyamide 11, polyamide 12, polyamide 6,6, polyamide 6/66 and aromatic polyamide such as polyamide 6I, polyamide 6T. MXD6, or combinations thereof.

In additional embodiments of the polyolefin films 110 described herein, other layers may be adhered to, for example, a polyethylene film by a tie layer (sometimes in addition to a barrier layer). For example, the polyolefin film 110 can further comprise other layers typically included in multilayer structures depending on the application including, for example, other barrier layers, sealant layers, other tie layers, other polyethylene layers, polypropylene layers, etc. For example, in some embodiments, a multilayer structure of the present invention can include both Non-limiting embodiments of suitable polyolefin films 110 can also include those disclosed in WO/2016/196168, WO/2018/064123, and WO/2018/063578, which are each incorporated by reference herein with respect to their teachings regarding polyolefin films.

As previously described, the polyolefin film 110 may, in some embodiments, comprise a printed layer 130. In such embodiments, it should be understood that the outermost layer of the polyolefin film is not the printed layer. As such, in some embodiments, The composition of the polyolefin film 110 at a point 15 microns or less into the polyolefin film 110 (e.g., 10 microns or 5 microns into the polyolefin film 110) measured from the first surface 114 may comprise polyolefin, as described herein, such as an ethylene or propylene based polymer. For example, at a depth of the polyolefin film 110 just below the printed layer 130, the polyolefin film 110 may comprise polyolefin, such as ethylene-based polymer, in an amount of at least 90 wt. %, at least 92 wt. %, at least 94 wt. %, at least 96 wt. %, at least 98 wt. %, at least 99 wt. %, at least 99.5 wt. %, at least 99.9 wt. %, or even at least 99.99 wt. %. In one or more embodiments, the coating 120 may comprise polyurethane. In some embodiments, the coating 120 may comprise polyurethane in an amount of at least 90 wt. %, at least 92 wt. %, at least 94 wt. %, at least 96 wt. %, at least 98 wt. %, at least 99 wt. %, at least 99.5 wt. %, at least 99.9 wt. %, or even at least 99.99 wt. %. It will be appreciated that the coating 120 may substantially comprise 100 wt. % polyurethane. For purposes of this disclosure "substantially comprise 100% polyurethane" means that the material is 100% polyurethane except for trace impurities or contaminants.

According to additional embodiments, the coating 120 may have a thickness of less than or equal to 25 microns, such as less than or equal to 20 microns, less than or equal to 15 microns, less than or equal to 10 microns, less than or equal to 5 microns, or even less than or equal to 3 microns. For example, the coating 120 may have a thickness of from 1 micron to 3 microns or from 2 microns to 3 microns. According to additional embodiments, the coating 120 may be applied to the polyolefin film 110 in a weight of from 1 gsm (grams per square meter) to 3 gsm, such as from 1 gsm to 2 gsm, or from 2 gsm to 3 gsm.

According to one or more embodiments described herein, the polyurethane in the coating 120 may be a polymerization reaction product of a polyurethane precursor which, according to one or more embodiments, may be a solventless polyurethane precursor. In one or more embodiments, the polyurethane precursor composition may include an isocyanate component and an isocyanate-reactive component (i.e., a component comprising hydroxyl terminated polymers). In some embodiments, the isocyanate component and the isocyanate-reactive component are present at a mix ratio of from 100:50 to 100:100 (parts by weight isocyanate component to parts by weight isocyanate-reactive component). However depending upon the constituents of the isocyanate component to isocyanate-reactive component, different amounts may be utilized.

According to embodiments of the present application, the polyurethane precursor may be a solventless polyurethane precursor. As described herein, a "solventless" system refers to one in which less than 1 wt. % of the system, i.e., the polyurethane precursor, is a volatile organic compound or non-reactive water. In additional embodiments, the polyurethane precursor may include less than or equal to 0.5 wt. %, less than or equal to 0.1 wt. %, or even less than or equal to 0.01 wt. % of volatile organic compounds or water. For example, the polyurethane precursors described herein may be void of components such as ethyl acetate or other commonly utilized solvents for polyurethane systems.

Solventless laminating adhesives, such as the polyurethane precursors described herein, can be applied up to one hundred percent solids without either organic solvent or an aqueous carrier. Because no organic solvent or water has to be dried from the adhesive upon application, these adhesives can be run at relatively high line speeds. Solvent and water-based laminating adhesives are limited by the rate at which the solvent or water can be effectively dried and removed from the laminate structure after application of the adhesive. For environmental, health, and safety reasons, laminating adhesives may preferably be aqueous or solventless.

In some embodiments, the isocyanate component may comprise an isocyanate-terminated prepolymer. In some embodiments, the isocyanate-terminated prepolymer is the reaction product of a polyisocyanate and a polyol component. In such a reaction, the polyisocyanate may be present in excess in order to produce an isocyanate-terminated prepolymer.

In some embodiments, suitable polyisocyanates for use according to this disclosure can be selected from the group consisting of an aliphatic polyisocyanate, a cycloaliphatic polyisocyanate, an aromatic polyisocyanate, and combinations of two or more thereof. As used herein, a "polyisocyanate" is any compound that contains two or more isocyanate groups. For example, polyisocyanates may include dimers, trimers, etc. An "aromatic polyisocyanate" is a polyisocyanate that has an isocyanate radical bonded to an aromatic radical and contains one or more aromatic rings. An "aliphatic polyisocyanate" contains no isocyanate radical directly bonded to an aromatic ring or is better defined as an isocyanate which contains an isocyanate radical bonded to an aliphatic radical which can be bonded to other aliphatic groups, a cycloaliphatic radical or an aromatic ring (radical). A "cycloaliphatic polyisocyanate" is a subset of aliphatic polyisocyanates, wherein the chemical chain is ring-structured.

Suitable aromatic polyisocyanates include, but are not limited to, 1,3- and 1,4-phenylene diisocyanate, 1,5-naphthylene diisocyanate, 2,6-tolulene diisocyanate ("2,6-TDI"). 2,4-tolulene diisocyanate ("2,4-TDI"), 2,4'-diphenylmethane diisocyanate ("2,4'-MDI"), 4,4'-diphenylmethane diisocyanate ("4,4'-MDI"), 3,3'-dimethyl-4,4'-biphenyldiisocyanate ("TODI"), and mixtures of two or more thereof. Suitable aliphatic polyisocyanates have 3 to 16 carbon atoms, or 4 to 12 carbon atoms, in the linear or branched alkylene residue, such as hexamethylene diisocyanate ("HDI") and 1,4-Diisocyanatobutane.

Suitable cycloaliphatic polyisocyanates have 4 to 18 carbon atoms, or 6 to 15 carbon atoms, in the cycloalkylene residue. Cycloaliphatic diisocyanates refer to both cyclically and aliphatically bound NCO groups, such as isophorone diisocyanate ("IPDI"), 1,3/1,4-diisocyanatocyclohexane 1,3-/1,4-bis(isocyanatomethyl)cyclohexane, and diisocyanatodicyclohexylmethane ("H12MDI").

Suitable aliphatic and cycloaliphatic polyisocyanates include, but are not limited to, cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate ("TIN"), decane di- and triisocyanate, undecane di- and triisocyanate and dodecane di- and triisocyanate, isophorone diisocyanate ("IPDI"), hexamethylene diisocyanate ("HDI"), diisocyanatodicyclohexylmethane ("H12MDI"), 2-methylpentane diisocyanate ("MPDI"), 2,2, 4-trimethylhexamethylene diisocyanate/2,4,4-trimethylhexamethylene diisocyanate ("TMDI"), norbornane diisocyanate ("NBDI"), xylylene diisocyanate ("XDI"), tetramethylxylylene diisocyanate, and dimers, trimers, and mixtures of the of two or more thereof. Additional polyisocyanates suitable for use according to this disclosure include, but are not limited to, 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methylpentane, and mixtures of the of two or more thereof.

According to one or more embodiments, the isocyanate component may have a NCO content of at greater than 10%, or at least 11%, at least 12%, at least 13%, at least 14%, or even at least 15%. In some embodiments, the isocyanate component has a NCO content not to exceed 25%, or 20%, or 13%. In some embodiments, the isocyanate component has a NCO content of greater than 10% and less than 20%, such as from 13% to 20%. 3 to 25%, or from 6 to 18%, or from 10 to 14%. NCO content, as described herein, is determined according to ASTM D2572. In some embodiments, the isocyanate component has viscosity at 25° C. of from 300 to 40000 mPa-s, such as from 2000 to 8000 mPa-s, as measured by the method of ASTM D2196.

According to additional embodiments, the polyisocyanate may comprise isocyanate monomers based on isomers of methyl diphenyl di-isocyanate 4-4, 2-4 and 2-2. These may be in a pure state or blended with other oligomers or pre-polymers terminated with NCO groups, and may be aromatics or aliphatics such as IPDI (Isophorone di-isocyanate) and HDI (Hexamethylene di-isocyanate). In additional embodiments, the polyisocyanate may comprise isocyanate monomers based on isomers of methyl Toluene di-isocyanate 2-4 and 2-6. These may be in a pure state or blended with other oligomers or pre-polymers terminated with NCO groups, and may be aromatics or aliphatics such as IPDI (Isophorone di-isocyanate) and HDI (Hexamethylene di-isocyanate).

According to additional embodiments, the polyol component may comprise Polyether-Polyol containing multiple hydroxyl groups with molecular lower than 5000 MW, with Bi, Tri or Tetra functionality, with Viscosity (@ 25° C.) below 10,000 cps in pure state. The hydroxyl number may be below 500 or comprise blends involving organic compounds such as TMP and/or DEG (trimethylolpropane and/or Di-ethylene glycol derivatives. In additional embodiments, the polyol component may comprise Polyester-Polyol based on Adipic and isophthalic acid in a concentration below 25% in total weight in pre-polymer.

According to an embodiment described herein, the isocyanate component may comprise methyl diphenyl di-isocyanate (such as pure methyl diphenyl di-isocyanate), and one or more polyether diols, such as polyether diols with varying molecular weights. According to such an embodiment, the methyl diphenyl di-isocyanate in the isocyanate component may be, by weight based on the weight of the isocyanate component, from 60 wt. % to 76 wt. %, such as from 66 wt. % to 70 wt. %, or from 67 wt. % to 69 wt. %. For example, a suitable methyl diphenyl di-isocyanate may be diphenylmethane diisocyanate (isomer 4,4 50% and 2,4 50%) (commercially available as ISONATE 50 OP from The Dow Chemical Company). The polyether diol in the isocyanate component may be, by weight based on the weight of the isocyanate component, from 24 wt. % to 40 wt. %, such as from 30 wt. % to 34 wt. %. The polyether diol in the isocyanate component may comprise polyether diols with nominal molecular weights from 400 to 460, such as polyether diol with a nominal molecular weight of 430 (commercially available as VORANOL 220-260 from The Dow Chemical Company), and polyether diols with nominal molecular weights from 1500 to 2500, such as polyether diol with a nominal molecular weight of 2000 (commercially available as VORANOL 220-056N from The Dow Chemical Company). The polyether diol with nominal molecular weight from 400 to 600 in the isocyanate component may be, by weight based on the weight of the isocyanate component, from 20 wt. % to 32 wt. %, such as from 22 wt. % to 30 wt. %, or from 25 wt. % to 27 wt. %. The polyether diol with nominal molecular weight from 1500 to 2500 in the isocyanate component may be, by weight based on the weight of the isocyanate component, from 4 wt. % to 8 wt. %, such as from 5 wt. % to 7 wt. %.

According to another embodiment described herein, the isocyanate component may comprise methyl diphenyl di-isocyanate (such as pure methyl diphenyl di-isocyanate, modified methyl diphenyl di-isocyanate, or both), one or more esterifications, one or more polyether polyols, and natural oil. According to such an embodiment, the methyl diphenyl di-isocyanate in the isocyanate component may be, by weight based on the weight of the isocyanate component, from 40 wt. % to 55 wt. %. The methyl diphenyl di-isocyanate in the isocyanate component may comprise pure methyl diphenyl di-isocyanate and modified methyl diphenyl di-isocyanate. For example, a suitable pure methyl diphenyl di-isocyanate may be diphenylmethane diisocyanate (isomer 4,4 50% and 2,4 50%) (commercially available as ISONATE 125M from The Dow Chemical Company). A suitable modified methyl diphenyl di-isocyanate may be polycarbodiimide-modified diphenylmethane diisocyanate (commercially available as ISONATE 143L from The Dow Chemical Company). The pure methyl diphenyl di-isocyanate in the isocyanate component may be, by weight based on the weight of the isocyanate component, from 35 wt. % to 40 wt. %, such as from 35 wt. % to 37 wt. %. The modified methyl diphenyl di-isocyanate in the isocyanate component may be, by weight based on the weight of the isocyanate component, from 5 wt. % to 15 wt. %, such as from 10 wt. % to 12 wt. %. The esterifications in the isocyanate component may be, by weight based on the weight of the isocyanate component, from 9 wt. % to 18 wt. %. A suitable esterification may be an esterification between Propylene Glycol, 1,6-Hexanediol, and Diethylene Glycol (compounds containing hydroxyl groups) and Adipic Acid (dicarboxylic acid) (commercially available as ADCOTE 111-43 (BB) from The Dow Chemical Company). Another suitable esterification may be an esterification between Isophthalic Acid and Adipic Acid (dicarboxylic acids) and Diethylene Glycol (compound containing hydroxyl groups) (commercially available from The Dow Chemical Company). The esterification between Propylene Glycol, 1,6-Hexanediol, and Diethylene Glycol (compounds containing hydroxyl groups) and Adipic Acid (dicarboxylic acid) in the isocyanate component may be, by weight based on the weight of the isocyanate component, from 7 wt. % to 14 wt. %, such as from 8 wt. % to 11 wt. %. The esterification between Isophthalic Acid and Adipic Acid (dicarboxylic acids) and Diethylene Glycol (compound containing hydroxyl groups) in the isocyanate component may be, by weight based on the weight of the isocyanate component, from 2 wt. % to 4 wt. %. The polyether polyol in the isocyanate component may be, by weight based on the weight of the isocyanate component, from 35 wt. % to 40 wt. %, such as from 36 wt. % to 39 wt. %. For example, a suitable polyether polyol may be Voranol 4701 (commercially available from The Dow Chemical Company). The natural oil, such as castor seed oil, in the isocyanate component may be, by weight based on the weight of the isocyanate component, from 2 wt. % to 4 wt. %.

According to another embodiment described herein, the isocyanate component may comprise methyl diphenyl di-isocyanate and polyether diol. The methyl diphenyl di-isocyanate in the isocyanate component may be, by weight based on the weight of the isocyanate component, from 50 wt. % to 60 wt. %, such as from 54 wt. % to 56 wt. %. A suitable methyl diphenyl di-isocyanate may be diphenylmethane diisocyanate (isomer 4,4 50% and 2,4 50%) (commercially available as ISONATE 50 OP from The Dow Chemical Company). The polyether diol in the isocyanate component may be, by weight based on the weight of the isocyanate component, from 40 wt. % to 60 wt. %, such as from 44 wt. % to 46 wt. %. A suitable polyether diol may a polyether diol with a nominal molecular weight of 800 to 1200, such as 1000 (commercially available as VORANOL 220-110N from The Dow Chemical Company).

In some embodiments, the isocyanate-reactive component comprises one or more bio-based polyols. Bio-based polyols refer to naturally derived oils such as, without limitation, castor oil or corn oil. Commercially available examples of castor oil suitable for use according to this disclosure include urethane grade castor oil available from Campbell & Co. or refined grade castor oil available from Vertellus. In some embodiments, the amount of the bio-based polyol in the isocyanate-reactive component may be, by weight based on the weight of the isocyanate-reactive component, from 50 wt. % to 100 wt. %. According to additional embodiments, the amount of the bio-based polyol in the isocyanate-reactive component may be, by weight based on the weight of the isocyanate-reactive component, at least 55 wt. %, at least 60 wt. %, at least 70 wt. %, at least 75 wt. %, at least 80 wt. %, at least 85 wt. %, at least 90 wt. %, or even at least 95 wt. %. According to one or more embodiments, the amount of the castor oil in the isocyanate-reactive component may be, by weight based on the weight of the isocyanate-reactive component, at least 50 wt. %, at least 55 wt. %, at least 60 wt. %, at least 70 wt. %, at least 75 wt. %, at least 80 wt. %, at least 85 wt. %, at least 90 wt. %, or even at least 95 wt. %. According to one or more embodiments, the amount of corn oil in the isocyanate-reactive component may be, by weight based on the weight of the isocyanate-reactive component, from 5 wt. % to 20 wt. %. The corn oil may act as a plasticizer. The moisture content of the corn oil may be less than 0.1 wt. %.

In addition to bio-based polyol, the isocyanate-reactive component may comprise one or more of a silicon additive, trimethylolpropane, and/or polyether polyol. According to one or more embodiments, the silicon additive in the isocyanate-reactive component may be, by weight based on the weight of the isocyanate-reactive component, from 0 wt. % to 1 wt. %, such as from 0.2 wt. % to 0.5 wt. %. The silicon additive may provide slip, gloss enhancement, pigment treatment and leveling for ink and coatings applications. The silicon additive may be a nonreactive silicone glycol copolymer surfactant supplied at 100% active concentration. In additional embodiments, the silicon additive may comprise one or more of Dimethyl, Methyl(propyl(poly(EO))acetate) Siloxane. According to additional embodiments, the trimethylolpropane in the isocyanate-reactive component may be, by weight based on the weight of the isocyanate-reactive component, from 0 wt. % to 8 wt. %, such as from 2 wt. % to 6 wt. %. According to additional embodiments, the polyether diol in the isocyanate-reactive component may be, by weight based on the weight of the isocyanate-reactive component, from 0 wt. % to 1 wt. %, such as from 0.2 wt. % to 0.5 wt. %. The polyether diol may have a nominal molecular weight of from 400 to 500.

According to one embodiment, the isocyanate-reactive component may comprise from 85 wt. % to 95 wt. % of castor oil, from 4.8 wt. % to 14.5 wt. % corn oil, and from 0.2 wt. % to 0.5 wt. % of silicon additive. The final hydroxyl number of such an embodiment may be from 140 to 157 mg KOH/g, measured according to ASTM D4274.

According to another embodiment, the isocyanate-reactive component may comprise from 50 wt. % to 70 wt. % of castor oil, from 2 wt. % to 6 wt. % of trimethylolpropane, from 5 wt. % to 15 wt. % corn oil, and from 15 wt. % to 35 wt. % polyether polyol. The final hydroxyl number of such an embodiment may be from 300 to 360 mg KOH/g, measured according to ASTM D4274.

According to additional embodiments, the isocyanate-reactive component may comprise hydroxyl terminated trifunctional oil from natural or synthetic source. The viscosity of such oils may be less than 1300 cps at 25° C. measured according to ASTM D4878 and a density of from 0.999 g/cc to 1.03 g/cc. The final hydroxyl number of such an embodiment may be from 25 to 600 mg KOH/g, measured according to ASTM D4274. The hydroxyl terminated trifunctional oil from natural or synthetic source in the isocyanate-reactive component may be, by weight based on the weight of the isocyanate-reactive component, from 85 wt. % to 95 wt. %.

Figure 3:
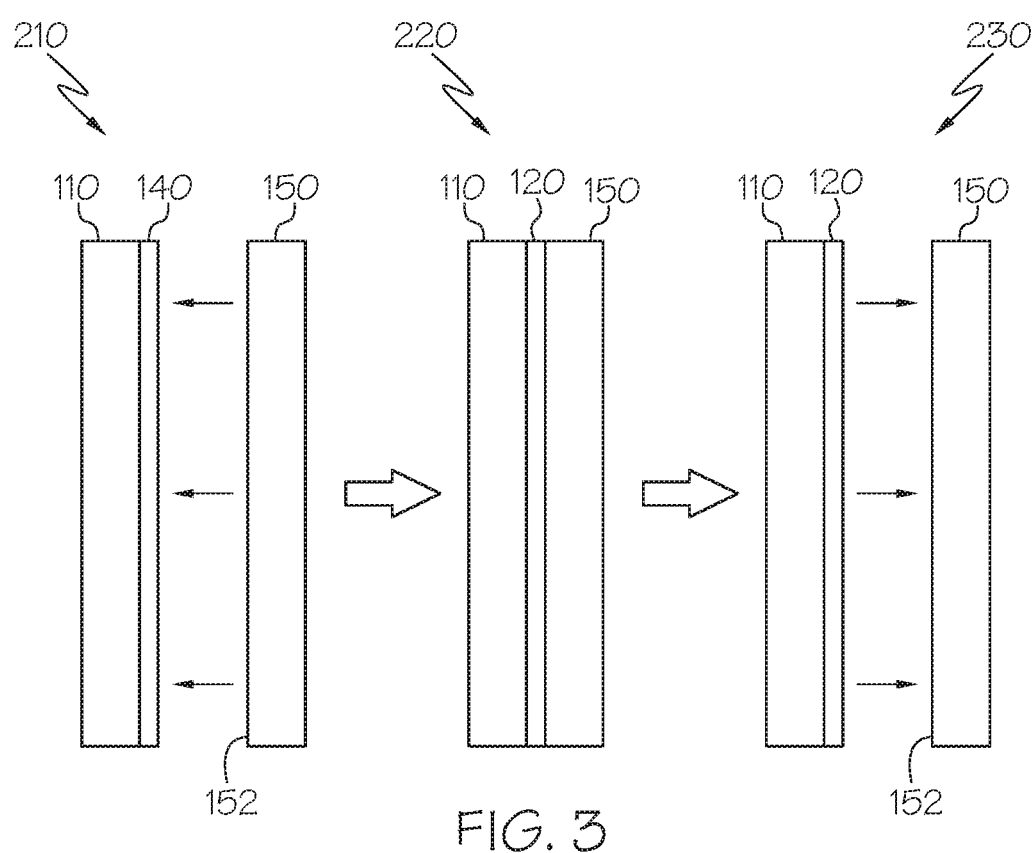
FIG. 3 schematically depicts process steps whereby a coated film is produced, according to one or more embodiments of the present disclosure.

According to one or more embodiments, the coated film 100 may be made by a process generally comprising the steps of applying the uncured polyurethane precursor 140 between the polyolefin film 110 and a release liner 150, curing the uncured polyurethane precursor, and removing the release liner 150 to form the coated film 100. The release liner may include a first surface 152, and the application of the uncured polyurethane precursor 140 may be such that the first surface 152 of the release liner 150 is in contact with the uncured polyurethane precursor 140. For example, in some embodiments, as depicted in FIG. 3, the uncured polyurethane precursor may be initially applied onto the polyolefin film 110 (prior to step 210 in FIG. 3). Thereafter, the release liner may be applied onto the uncured polyurethane precursor 140 which is positioned on the polyolefin film 110 (step 210 in FIG. 3). As described herein, "applying" a film or adhesive may include bringing one or more components of the described systems into contact with one another, such as by lamination processing.

In one or more embodiments, the application of the uncured polyurethane precursor 140 between the polyolefin film 110 and the release liner 150 may be performed by a lamination process on a conventional lamination machine. For example, according to one or more embodiments, the uncured polyurethane precursor 140 may be applied onto the polyolefin film 110 as the polyolefin film is translated in a machine direction. That is, the polyolefin film 110 may be conveyed in a machine direction while the uncured polyurethane precursor 140 is applied. As described herein, the machine direction refers to the direction in which the film flows onto or into a processing machine, such as the laminator or slitter. The uncured polyurethane precursor 140 may be deposited onto the polyolefin film 110 with either smooth rolls or gravure rolls, which may be selected, at least in part, by the viscosity of the uncured polyurethane precursor 140. The release liner 150 may come into contact with the uncured polyurethane precursor 140 at the nip of the lamination machine. In such embodiments, the polyolefin film 110 may begin in a rolled form, to be unwound and conveyed in a machine direction where the uncured polyurethane precursor 140 and the release liner 150 are applied, and then be re-wound into a roll the includes films comprising the polyolefin film 110, the uncured polyurethane precursor 140, and the release liner 150.

According to embodiments disclosed herein, following the application of the uncured polyurethane precursor 140, the uncured polyurethane precursor 140 may be cured to form the coating 120 comprising the cured polyurethane layer positioned between the polyolefin film 110 and the release liner 150. The curing may be "passive," meaning that the curing takes place by allowing the uncured polyurethane precursor 140 to rest at ambient conditions for a period of time. Alternatively, the curing may be facilitated by exposure to increased temperatures, radiation, or other mechanisms that may cause curing to take place in a particular polyurethane system. In some embodiments, the curing may take place while the polyolefin film 110, uncured polyurethane precursor 140, and release liner 150 are in a roll following lamination. Following a period of time, the uncured polyurethane precursor 140 solidifies and forms a roll of film comprising the coated film 100, coating 120, and release liner 150.

Figure 4:
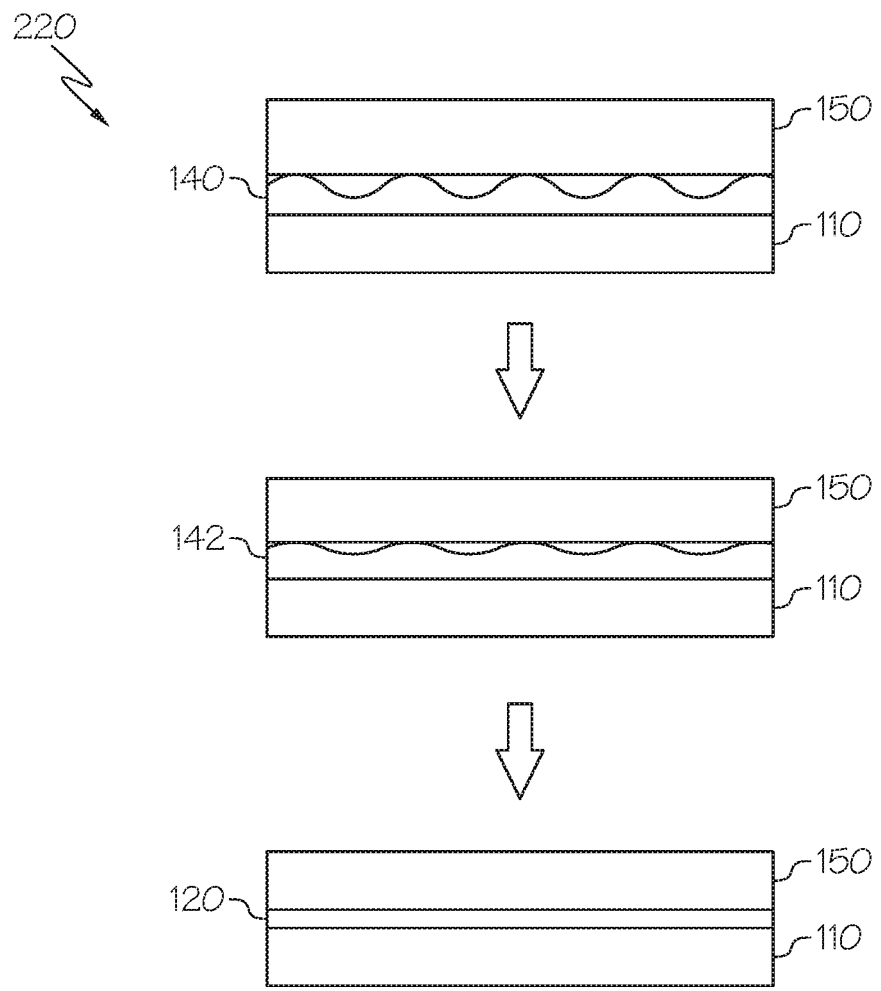
FIG. 4 schematically depicts process steps whereby an uncured polyurethane precursor is cured to form a layer comprising polyurethane, according to one or more embodiments of the present disclosure.

Now referring to FIG. 4, a generalized depiction of the curing process is shown. In one or more embodiments, the uncured polyurethane precursor 140 may be positioned between the release liner 150 and the polyolefin film 110. As time proceeds, a partially cured polyurethane layer 142 is formed. As more time passes, a fully cured coating 120 comprising polyurethane is formed.

Following the curing step, the release liner 150 may be removed from the coating 120 to form the coated film 100 (depicted in step 230 of FIG. 3). It should be understood that the recovery of the release liner 150 may lower costs in the production of a coated film 100 since less material may be needed and the release liner 150 can be re-used numerous times (i.e., it may be laminated to the uncured polyurethane precursor 140, then removed, and then laminated to a subsequent uncured polyurethane precursor 140 in another batch).

In one or more embodiments, the removal of the release liner 150 may be performed by unrolling the film that includes the polyolefin film 110, coating 120, and release liner 150 and removing the release liner 150 while the coated film 100 is conveyed in a machine direction. For example, as the film that includes the polyolefin film 110, coating 120, and release liner 150 is unrolled, the release liner 150 may be removed and rolled into a roll containing only the release liner 150. The coated film 100 can be re-rolled, where it may be further processed, such as by slitting, prior to being re-rolled into a roll containing the coated film 100.

In one or more embodiments, and without limitation, the release liner 150 may be a polymeric film and may be a monolayer film or a multilayer film. For example, and without limitation, the release liner may be a polypropylene film. In some embodiments, the release liner is a biaxially oriented polypropylene film. In some embodiments, the release liner may be a polyethylene film, such as an LPDE film. In some embodiments, such as where the release liner is a polypropylene or a polyethylene film, one side of the film (the side to contact the polyurethane coating) can be embossed or treated (or not) in order to impart a particular finish into the polyurethane coating. The release liner 150 may comprise a first surface 152 which comes into contact with the uncured polyurethane precursor 140 that has a relatively low surface energy. For example, this surface may have a surface energy of 34 dynes/cm or less, such as 33 dynes/cm or less, or even 32 dynes/cm or less. The relatively low surface energy may allow for removal of the release liner 150 from the coating 120 during fabrication of the coated film 100. In additional embodiments, the release liner 150 may comprise siliconized paper or other non-polymeric materials. The release liner may be capable of being rolled and unrolled, be non-absorbent, and/or have sufficiently low friction as to not heat when rolled and unrolled.

The first surface 152 may also comprise an optical finish that is desired to be imparted to the polyurethane coating. As described herein, the first surface may have a gloss, matte, or other optical finish, as described herein. The release liner 150 may impart one or more optical properties onto the coating 120, and, the coating 120 mimics the optical finish of the release liner 150.

According to one or more embodiments, at least a portion of the outer surface 122 of a surface of the coated film that comprises the coating 120 (e.g., the outer surface 122 of the coating 120) has a desired optical finish of gloss or matte. As is described herein, these optical properties are achieved by the presently disclosed processing steps during the fabrication of the coated film 100. In one or more embodiments, the removal of the release liner 150 reveals the coating 120, which may impart the coating 120 with an optical finish. In one or more embodiments, and without being bound by any particular theory, it is believed that the curing of the uncured polyurethane precursor 140 to form a cured coating 120 comprising the polyurethane layer may impart an optical finish to the coating 120 of cured polyurethane substantially similar to the optical finish of the first surface 152 of the release liner 150. As described herein, a "substantially similar" optical finish may mean that one or more optical features, such as gloss level or matte finish, are within 25 gloss or matte units of the first surface 152 of the release liner 150. In additional embodiments, the gloss level or matte finish of the coating 120 may be within 20 gloss or matte units, 15 gloss or matte units, 10 gloss or matte units, or even 5 gloss or matte units of the release liner 150. For example, the coated film may have gloss or matte finish that is within 25 units of the release liner when measured at 60° for a gloss finish or 85° for a matte finish. For example, in some embodiments, a release liner 150 with a gloss finish (such as from 40 units to 100 units) may be utilized to impart a gloss finish on the coated film 100 that is within 25 units, within 20 units, within 15 units, within 10 units, or even within 5 units of the release liner 150 when measured at 60°. In additional embodiments, a release liner 150 with a matte finish (such as from 15 units to 30 units) may be utilized to impart a matte finish on the coated film 100 that is within 25 units, within 20 units, within 15 units, within 10 units, or even within 5 units of the release liner 150 when measured at 85°.

For example, in one or more embodiments, at least a portion of a surface of the coated film 100 that comprises the coating 120 has a gloss of from 40 units to 100 units at 60°. As described herein, gloss is measured by utilizing the ASTM D2457 standard. In additional embodiments, the gloss at 60° may be from 40 units to 50 units, from 50 units to 60 units, from 60 units to 70 units, from 70 units to 80 units, from 80 units to 90 units, from 90 units to 100 units, or any combination thereof. For example, the gloss at 60° may be within the range of from 40 units to 100 units and at least 50 units, at least 60 units, at least 70 units, at least 80 units, at least 90 units, less than or equal to 90 units, less than or equal to 80 units, less than or equal to 70 units, less than or equal to 60 units, or less than or equal to 50 units.

In one or more additional embodiments, at least a portion of a surface of the coated film 100 that comprises the coating 120 has a matte finish of from 15 units to 30 units at 85°. As described herein, matte finish is also measured by utilizing the ASTM D2457 standard. In additional embodiments, the matte finish at 85° may be from 15 units to 20 units, from 20 units to 25 units, from 25 units to 30 units, or any combination thereof. For example, the matte finish at 85° may be within the range of from 15 units to 30 units and at least 20 units, at least 25 units, less than or equal to 25 units, or less than or equal to 20 units.

As should be apparent from the present disclosure, numerous advantages may be present in the presently described coated films and methods for the making thereof. In particular, a film manufacturer may provide a film with a similar gloss or matte finish to conventional films which utilizes fewer layers. Additionally, the same materials (i.e., polyolefin film and polyurethane layer) may be utilized to from films with varying optical finishes which are controlled by selection of a specific release liner.

Figure 5:
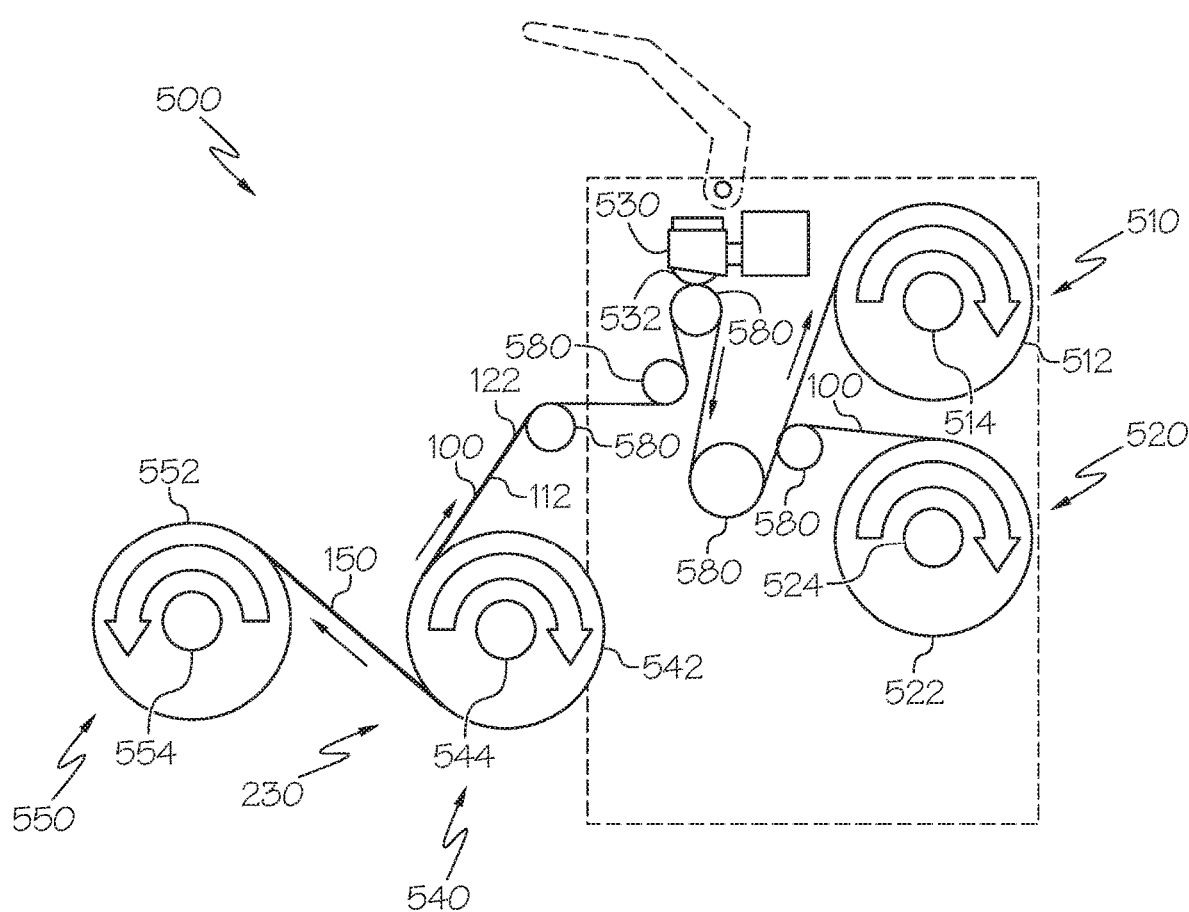
FIG. 5 schematically depicts a side view of a slitting machine that may be utilized to remove the release liner, according to one or more embodiments of the present disclosure.

Now referring to FIGS. 5 and 6, according to one or more embodiments, the processes disclosed herein for forming coated films 100 may be performed on a slitting machine 500. The slitting machine 500 may comprise at least a laminated film unwinding apparatus 540, a release liner recovery apparatus 550, a cutting apparatus 530, and a plurality of polymer substrate strip rewinding apparatuses (e.g., a first polymer substrate strip rewinding apparatus 510 and a second polymer substrate strip rewinding apparatus 520). It should be appreciated that FIGS. 5 and 6 depict the respective films being moved in the machine direction (identified with arrows in FIGS. 5 and 6), which may be determined by the one or more roller guides 580. One skilled in the art would appreciate that such roller guides 580 may enhance some aspects of the slitting processing but may be optional in some embodiments. It should also be appreciated that some roller guides 580 and other disclosed spools may be mechanically driven, while others may rotate freely under the force of the drive from other roller guides and/or spools. Additionally, it should be appreciated that FIG. 6, for clarity, shows the first and second polymer substrate strip rewinding apparatuses 510, 520 as offset from one another so that both are visible from a top view. Additionally, in FIG. 6, broken lines signify the edge of a roll that would not be exposed from a top view.

In one or more embodiments, the laminated film unwinding apparatus 540 may be operable to unwind a roll of laminated film 542. In one or more embodiments, the laminated film unwinding apparatus 540 may comprise a laminated film spool 544 that rotates with a roll of laminated film 542 that may be mounted on the laminated film spool 544. The laminated film spool 544 may be mechanically driven by a motor or other like mechanical drive to rotate the roll of laminated film 542. It should be appreciated that the arrow depicted on the roll of laminated film 542 shows the direction of rotation of the roll of laminated film 542, according to one or more embodiments.

According to one or more embodiments, the release liner recovery apparatus 550 may be operable to wind the release liner 150 that is released from the polymer substrate. As described herein, the polymer substrate may include or consist of, e.g., the coated film 100 described herein (as depicted in FIGS. 5 and 6), or any other coated or uncoated polymeric film. It should be appreciated that, while the slitting machine 500 is described with respect to forming the coated film 100 presently described, it may be utilized with other laminated systems, such as those that do not include coatings. In one or more embodiments, the release liner recovery apparatus 550 may comprise a release liner recovery spool 554 that rotates with the roll of release liner 552 that may be mounted on the release liner recovery spool 554. The release liner recovery spool 554 may be mechanically driven by a motor or other like mechanical drive to rotate the roll of release liner 552. It should be appreciated that the arrow depicted on the roll of release liner 552 shows the direction of rotation of the roll of release liner 552, according to one or more embodiments.

In one or more embodiments, the release liner recovery apparatus 550 may be designed for winding of 5 micron to 50 micron thickness film having a web thickness of from 800 mm to 1300 mm. The role core may have a diameter of from 3 inches to 6 inches, according to some embodiments. The winding tension of the release liner recovery apparatus 550 may be from 0.5 pli (pounds per linear inch) to 2.5 pli. In some embodiments, the release liner recovery apparatus 550 may comprise an asynchronous servo motor. For example, in some embodiments, a SolPower SVM-100L servo motor may be suitable for use. However, as would be known to one skilled in the art, the motor may be chosen based on various parameters such as winding power requirements based on the size and material of the release liner to be wound.

As is depicted in FIG. 5, the release liner 150 may be separated from the coated film 100 while the laminated film is in the roll of laminated film 542 on the laminated film spool 544. The respective rotation of the release liner recovery spool 554 and the laminated film spool 544 may function to separate the release liner from the coated film 100. The release liner 150 may be carried from the roll of laminated film 542 to the roll of release liner 552. The coated film 100 may be carried to the cutting apparatus 530.

In one or more embodiments, the cutting apparatus 530 may be operable to cut at least the coated film 100 along the machine direction. Now referring to FIG. 6, depicting a top view of a slitting machine 500, as well as FIG. 5, the cutting apparatus 530 may comprise a plurality of blades 532 or other cutting devices (e.g., other cutting devices such as lasers are contemplated). The cutting apparatus 530 may divide the polymer substrate 100 into strips by cutting along the machine direction. This cutting may form multiple strips, such as the four strips depicted in FIG. 6. It should be understood the number and width of the strips may vary based on various desired parameters of the finished coated film, such as material composition and/or desired end use. The cutting apparatus 530 may comprise a plurality of blades arranged in intervals across a width of the polymer substrate, where the "width" is measured perpendicular to the machine direction (i.e., vertically in FIG. 6). The blades may be arranged approximately in a line perpendicular to the machine direction, as depicted in FIG. 6. However, other configurations of the cutting apparatus are contemplated, as would be appreciated by one skilled in the art.

The plurality of polymer substrate strip rewinding apparatuses 510, 520 may be operable to wind one or more strips of the polymer substrate 100. As depicted in FIGS. 5 and 6, the strips of coated film 100 may be wound onto polymer substrate strip rewinding spools 514, 524. As such, the coated film 100 may be wound into a plurality of rolls comprising the polymer substrate 512, 522. The one or more polymer substrate strip rewinding spools 514, 524 may each rotate to wind the strips of coated film 100 into multiple rolls 512, 522. Each polymer substrate strip rewinding spool 514, 524 may include multiple rolls, such as a roll of every other strip of the coated film 100, as may be appreciated by those skilled in the art and familiar with slitting machines. It should be appreciated that the arrow depicted on the roll of coated film 512, 522 shows the direction of rotation of the roll of release liner 552, according to one or more embodiments. It should be appreciated that FIG. 6, for clarity, shows the first and second polymer substrate strip rewinding apparatuses 510, 520 as offset from one another so that both are visible from a top view.

EXAMPLES

Examples are provided herein which may disclose one or more embodiments of the present disclosure. However, the Examples should not be viewed as limiting on the claimed embodiments hereinafter provided.

Example 1—Fabrication of Coated Films with Varying Polyurethane Compositions

Five different formulations of polyurethane systems, shown in Table 1 as Polyurethane Systems A-E, are applied on polyethylene (PE) coextruded film and then laminated to a biaxially oriented polypropylene film (BOPP), having a thickness of 25 microns, which functioned as the release liner. The polyethylene coextruded is a five layer, 100 micron film having the layers depicted in Table 2. The PE coextruded film is printed on the side where the polyurethane system is applied, having a graphic art layer of 1.5 microns. The release liner is a clear BOPP film with 25 micron thickness and a gloss of 90 to 95 units at 60°. The lamination to the BOPP is on the non-treated side of the BOPP film. The polyurethane layer is 1.8 microns in thickness after curing. After the curing time, the BOPP is delaminated (i.e., removed) from the laminated system, leaving only the polyethylene co-extruded film and a polyurethane coating. The gloss units are measured using a BYK Gardner Micro-Tri-Gloss Gloss Meter at 60°, consistent with ASTM D2457. The results of the gloss testing are shown in Table 1. Systems E shows high tack after 3 days, whereas Systems A. B. C. and D does not have high tack after 3 days.

The NCO and OH parts of the polyurethane Systems A-E are described in Table 2 according to "Reactive Parts V, W, and X" and "Co-reactive Mixtures Y and Z." Each of these components is described in detail below.

In Table 1, "Reactive Mixture V" includes 68 wt. % diphenylmethane diisocyanate (isomer 4,4 50% and 2,4 50%) (commercially available as ISONATE 50 OP from The Dow Chemical Company), 26 wt. % Polyether diol (nominal molecular weight of 430) (commercially available as Voranol 220-260 from The Dow Chemical Company), and Polyether diol (nominal molecular weight of 2000) (commercially available as Voranol 220-056N from The Dow Chemical Company).

In Table 1, "Reactive Mixture W" includes 36.2 wt. % diphenylmethane diisocyanate (isomer 4,4 50% and 2.4 50%) (commercially available as ISONATE 125M from The Dow Chemical Company), 11.2 wt. % polycarbodiimide-modified diphenylmethane diisocyanate (commercially available as ISONATE 143L from The Dow Chemical Company), 9.6 wt. % Esterification between Propylene Glycol, 1,6-Hexanediol, and Diethylene Glycol (compounds containing hydroxyl groups) and Adipic Acid (dicarboxylic acid) (commercially available as ADCOTE 111-43 (BB) from The Dow Chemical Company), 2.96 wt. % Esterification between Isophthalic Acid and Adipic Acid (dicarboxylic acids) and Diethylene Glycol (compound containing hydroxyl groups) (commercially available as MOR-FREE 218 (BB) from The Dow Chemical Company), 37.24 wt. % Poliol Polyether (commercially available as PUP 4701 DRST204KG from The Dow Chemical Company), and 2.93 wt. % Natural oil from castor seed (commercially available as Castor Oil AA Standard from Vertellus).

In Table 1, "Reactive Mixture X" includes 55 wt. % diphenylmethane diisocyanate (isomer 4,4 50% and 2.4 50%) (commercially available as ISONATE 50 OP from The Dow Chemical Company) and 45 wt. % Polyether diol (nominal molecular weight of 1000) (commercially available as Voranol 220-110n from The Dow Chemical Company).

In Table 1, "Co-reactive Mixture Z" includes 90 wt. % natural oil from castor seed (Castor Oil AA Standard, commercially available from Vertellus), 9.7 wt. % corn oil, and 0.3 wt. % silicon additive (DC 57, commercially available from Dow Corning). "Co-reactive Mixture Y" included 60 wt. % natural oil from castor seed (Castor Oil AA Standard, commercially available from Vertellus), 4.0 wt. % trimethylolpropane, 25 wt. % polyether diol with nominal molecular weight of 450 (commercially available as VORANOL CP 450 polyol from The Dow Chemical Company).

As shown in Table 1, the gloss is measured for each system, where gloss represents the ASTM D2457 testing standard at 60°. Polyurethane System A shows results which most mimicked the 90 to 95 unit gloss of the BOPP release liner. Additionally, Polyurethane System D has good gloss matching.

TABLE 1

| Polyurethane System | Reactive Part (NCO) | Co-reactive Part (OH) | Gloss From BOPP Release Liner (units) |
|---|---|---|---|
| A | Reactive Mixture V | Co-reactive Mixture Z | 98 |
| B | Reactive Mixture W | Co-reactive Mixture Y | 66 |
| C | Reactive Mixture V | Co-reactive Mixture Y | 74 |

TABLE 1-continued

| Polyurethane System | Reactive Part (NCO) | Co-reactive Part (OH) | Gloss From BOPP Release Liner (units) |
|---|---|---|---|
| D | Reactive Mixture W | Co-reactive Mixture Z | 81 |
| E | Reactive Mixture X | Co-reactive Mixture Z | 83 |

TABLE 2

| Layer of film | Layer thickness (microns) | Layer composition |
|---|---|---|
| 1 | 30 | 100% INNATE ST50 |
| 2 | 20 | 85% ELITE 5960G + 15% AMPLIFY TY 1057H |
| 3 | 10 | 100% Polyamide |
| 4 | 20 | 85% ELITE 5960G + 15% AMPLIFY TY 1057H |
| 5 | 20 | 60% AFFINITY 1880G + 20% INNATE ST50 + 20% AGILITY 1000 |

Example 2—Texture Based on Variation of Release Films

With the same methodology as in Example 1, several coated films are prepared with varying release liner compositions. These release liners include polypropylene, high density polyethylene, polyester, matte BOPP, and embossed polyethylene films. Table 3 shows the compositions utilized for the tested release liners.

With reference to the optics of the formed coated films, the BOPP system takes the high gloss from the BOPP film, which has original gloss of around 90-95 units. On the other hand, when the system is in contact with an opaque film such as the embossed LDPE film, the polyurethane copies the low gloss from the polyethylene film, which has original units of gloss of 40-45 units.

When PET is used as release liner, it is not possible to remove after curing time due to its natural high surface tension present in both sides. The polyurethane adheres strongly on the PET surface and generates destruction of the film when intended to delaminate.

The matte BOPP film originally has 15 units of gloss. After delamination the PU copies the matte finishing and exhibits 21 units at 85°. This result supports the theory that the polyurethane mimics the surface with which it comes in contact.

When the embossed PE (without treatment) is utilized as the release liner, the polyurethane copies the patterns of the original film by showing matte finishing in the small areas where the film has ridges and glossy areas that coincide with the areas of valleys from embossed film.

TABLE 3

| Release liner material | Thickness (microns) | Film description | Surface tension in contact with coating dynes/cm | Optics |
|---|---|---|---|---|
| BOPP (Bioriented polypropylene) | 25 | BOPP Plain is Co-extruded film, Non sealable and one side treated | 32 | High gloss units 90-95 units @ 60°, high clarity |
| PET (Polyethylene terephfthalate) | 14 | Non sealable and both side treated. one side corona treated, other side chemically treated | 42 | High gloss, high clarity |
| Matte BOPP | 25 | BOPP Plain is Co-extruded film, Non sealable and one side treated | 32 | Matte finishing having gloss of 15 units at 85° |
| Embossed LDPE | 12 | Monolayer 15 % LDPE, 40% LLD, 45% HDPE | 32 | White PE, low gloss 40-45 units at 60° |

Example 3—Temperature Resistance of Coated Films

The coated films of Example 1 are tested for temperature resistance using a method based on ASTM 1921. Specifically, the specimens are sealed face to face using a Sencor sealing machine set up at 40 psi and 0.5 seconds. Temperature is increased from 120 to 180° C. Table 4 shows the results of the temperature resistance testing. On Table 4, "X" refers to specimen melting or cutting, "O" refers to specimen resistant to heat, and "S" refers to specimen starting to shrink under heat.

TABLE 4

| | Temperature resistance @ 40 psi, 0.5 sec | | | | |
|---|---|---|---|---|---|
| PU System | 120° C. | 140° C. | 150° C. | 160° C. | 180° C. |
| PE film without PU | X | X | X | X | X |
| A | O | O | O | O | S |

TABLE 4-continued

| | Temperature resistance @ 40 psi, 0.5 sec | | | | |
|---|---|---|---|---|---|
| PU System | 120° C. | 140° C. | 150° C. | 160° C. | 180° C. |
| B | O | O | O | O | S |
| C | O | O | O | O | S |
| D | O | O | O | O | S |
| E | O | O | O | O | S |

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

It will be apparent in combination with the claims and drawings that use of the singular also includes the possibility of the plural. For example, reference to a coating layer also implicitly includes reference to at least one coating layer.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A process for making a coated film, the process comprising:
    applying an uncured polyurethane precursor between a polyolefin film and a release liner such that a first surface of the release liner is in contact with the uncured polyurethane precursor, wherein the first surface of the release liner has an optical finish;
    curing the uncured polyurethane precursor to form a cured polyurethane layer positioned between the polyolefin film and the release liner, wherein:
        the curing imparts an optical finish to the cured polyurethane layer substantially similar to the optical finish of the first surface of the release liner, and
        the uncured polyurethane precursor comprises an isocyanate-reactive component comprising at least one bio-based polyol; and
    removing the release liner to form the coated film comprising the polyolefin film and the cured polyurethane layer.

2. The process of claim 1, wherein the applying of the uncured polyurethane precursor between the polyolefin film and the release liner comprises:
    applying the uncured polyurethane precursor onto the polyolefin film; and
    following the applying of the uncured polyurethane precursor onto the polyolefin film, applying a release liner onto the uncured polyurethane precursor on the polyolefin film.

3. The process of claim 1, wherein the bio-based polyol in the isocyanate-reactive component is, by weight based on the weight of the isocyanate-reactive component, at least 50 wt. %.

4. The process of claim 1, wherein the release liner comprises polypropylene, polyethylene, or combinations thereof.

5. The process of claim 1, wherein the first surface of the release liner has a surface energy of less than or equal to 34 dynes/cm.

6. The process of claim 1, wherein the uncured polyurethane precursor is a laminating adhesive comprising less than 1 wt. % of water or volatile organic compounds.

7. The process of claim 1, wherein the uncured polyurethane precursor comprises from 0 wt. % to 1 wt. % of volatile organic compounds and an isocyanate component comprising an isocyanate-terminated prepolymer, wherein:
    the isocyanate component has an isocyanate (NCO) content greater than 10%, and
    the bio-based polyol in the isocyanate-reactive component is, by weight based on the weight of the isocyanate-reactive component, at least 50 wt. %.

8. The process of claim 7, wherein the bio-based polyol comprises castor oil, and wherein the castor oil in the isocyanate-reactive component is, by weight based on the weight of the isocyanate-reactive component, at least 50 wt. %.

9. The process of claim 7, wherein the isocyanate component comprises from 60 wt. % to 76 wt. % of methyl diphenyl di-isocyanate and from 24 wt. % to 40 wt. % of a polyether diol, based on the total weight of the isocyanate component.

10. The process of claim 7, wherein the uncured polyurethane precursor comprises from 0 wt. % to 0.1 wt. % of volatile organic compounds.

11. The process of claim 1, wherein the polyolefin film has a thickness of greater than or equal to 50 microns.

12. A process for making a coating film, the process comprising:
    applying an uncured polyurethane precursor onto a polyolefin film as it is translated in a machine direction;
    applying a release liner onto the uncured polyurethane precursor as it is translated in the machine direction such that a first surface of the release liner is in contact with the uncured polyurethane precursor, wherein:
        the first surface of the release liner has an optical finish; and
        the uncured polyurethane precursor is disposed between the polyolefin film and the release liner;
    curing the uncured polyurethane precursor to form a cured polyurethane layer positioned between the polyolefin film and the release liner, wherein:
        the curing imparts an optical finish to the cured polyurethane layer substantially similar to the optical finish of the first surface of the release liner, and
        the uncured polyurethane precursor comprises an isocyanate-reactive component comprising at least one bio-based polyol; and
    removing the release liner to form the coated film comprising the polyolefin film and the cured polyurethane layer, wherein the release liner is removed as the coated film is translated in a machine direction.

13. The process of claim 12, wherein the bio-based polyol in the isocyanate-reactive component is, by weight based on the weight of the isocyanate-reactive component, at least 50 wt. %.

14. The process of claim 12, wherein the release liner comprises polypropylene, polyethylene, or combinations thereof.

15. The process of claim 12, wherein the first surface of the release liner has a surface energy of less than or equal to 34 dynes/cm.

16. The process of claim 12, wherein the uncured polyurethane precursor comprises:

from 0 wt. % to 1 wt. % of volatile organic compounds;
an isocyanate component comprising an isocyanate-terminated prepolymer, wherein:
   the isocyanate component has an isocyanate (NCO) content greater than 10%; and
   the bio-based polyol in the isocyanate-reactive component is, by weight based on the weight of the isocyanate-reactive component, at least 50 wt. %.

17. The process of claim 16, wherein the isocyanate component comprises from 60 wt. % to 76 wt. % of methyl diphenyl di-isocyanate and from 24 wt. % to 40 wt. % of a polyether diol, based on the total weight of the isocyanate component.

18. The process of claim 16, wherein the uncured polyurethane precursor comprises from 0 wt. % to 0.1 wt. % of volatile organic compounds.

19. The process of claim 12, wherein the polyolefin film has a thickness of greater than or equal to 50 microns.

* * * * *